ELECTRICAL CONNECTION BETWEEN SUPERCONDUCTORS

Filed Sept. 23, 1968 2 Sheets-Sheet 1

INVENTORS
Erki Karvonen
Jean-Marie Rayroux
BY
Pierce, Scheffler & Parker
Attorneys

ELECTRICAL CONNECTION BETWEEN SUPERCONDUCTORS

INVENTORS
Erki Karvonen
Jean-Marie Rayroux
BY
Pierce, Scheffler & Parker
Attorneys

United States Patent Office 3,527,876

Patented Sept. 8, 1970

3,527,876

ELECTRICAL CONNECTION BETWEEN SUPERCONDUCTORS

Erki Karvonen, Helsinki, Finland, and Jean-Marie Rayroux, Baden, Switzerland, assignors to Aktiengesellschaft Brown, Boveri & Cie, Baden, Switzerland, a joint-stock company Filed Sept. 23, 1968, Ser. No. 761,651
Claims priority, application Switzerland, Oct. 23, 1969, 14,374
Int. Cl. H02g 15/08
U.S. Cl. 174—94 7 Claims

ABSTRACT OF THE DISCLOSURE

An electrical connection between the end portions of two conductors made of hard-super-conductive material is formed by spot welding the conductor end portions to a plate also made from a hard-superconductive material in which the critical current-density has been increased by annealing. The hard-superconductive conductors are coated with copper which is removed at the places where the spot welds are made, and these copper coatings are electrically connected to a sheet of copper which forms an underlay for the hard-superconductive plate.

The invention relates to an electrical connection between the ends of two conductors wherof at least one is made of a hard-superconductive material.

The discovery of superconductive materials which do not lose their superconductivity even in the presence of fairly high magnetic field-strengths has made it possible in recent years to construct for the first time certain devices such for example as superconductive coils for generating high magnetic field-strengths. The best known of the superconductive materials of this kind, which are generally called "hard superconductors," takes the form of a niobium-zirconium alloy which, when made into wires or strips, is suitable for constructing coils with which values of magnetic induction of over 30 kg. may be generated. In the construction of such coils, a particularly difficult problem is involved in making electrical connections between superconductive conductor elements and between such elements and the current-source. In these devices, the connections in fact nearly always constitute points of minimum "critical current-density," and thus define the onset of transition to the normal conductive state.

In a known process for making a connection between two hard-superconductive wires which allows for sufficiently high current-density in the superconductive state in the presence of a magnetic induction of more than 30 kg., the wires to be connected are freed of their insulating or normal conductive surface layers, as distinguished from superconductor, and connected to one another with the aid of a clamping element whereof the clamping jaws are coated with a layer of a hard-superconductive material. Although such a clamped connection exhibits a sufficiently low electrical resistance of $10^{-6}\,\Omega$, which moreover has little dependence on the magnetic induction, the fact that it occupies a relatively large amount of space makes it unsuitable for many purposes such for example as connecting two conductors inside a coil.

According to another known process, the ends of the conductors are connected by spot-welding. Such connections have a very low electrical resistance of $\sim 10^{-7}\,\Omega$, but the welding produces structural changes in the ends of the conductors which considerably reduce the critical current-density at these points. Such connections can thus be used only at points of relatively low induction.

The invention is based on the problem of providing an electrical connection between hard-superconductive conductors which does not exhibit the said disadvantages of known connections.

According to the present invention there is provided an electrical connection between the ends of two conductors whereof at least one is made of a hard-superconductive material, the connection exhibiting an electrical resistance of less than $10^{-6}\,\Omega$ in the presence of a magnetic induction of 30 kg., wherein the ends of the conductors are spot-welded to a plate made of a hard-superconductive material of the type in which the critical current-density has been increased by annealing.

The invention is explained, by way of example, with reference to the accompanying drawings wherein.

Figure 2:
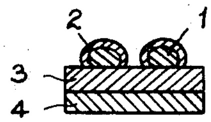
FIG. 2 is a transverse section on line II—II of FIG. 1.
Figure 1:
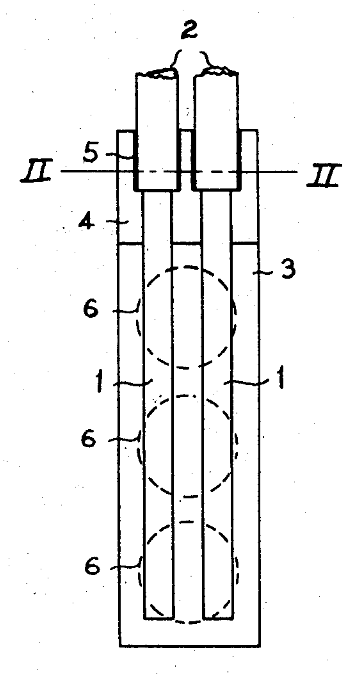
FIG. 1 is a plan view of the two conductors as connected together.

A connection between two hard-superconductive wires is illustrated in FIGS. 1 and 2. The wires 1, which are made of a niobium-zirconium alloy with 25% by weight of zirconium, are provided with a copper coating 2 which is removed at the ends of the wires where the connection is to be made. The ends of the wires are spot-welded to a plate 3. This plate 3 is made of a niobium-titanium alloy with 40% by weight of titanium, and is connected at the back to a copper sheet 4 extending beyond the plate 3, which sheet is soldered at the points 5 to the copper coatings 2 of the wires 1 for the purpose of forming a normal conductor shunt connection. FIG. 1 shows the outlines 6 of the spot-welds which each connect the ends of both wires to the plate 3.

The alloy used for the plate 3 is one of those hard-superconductive materials in which the critical current-density is increased during production by annealing after the last change in shape, and not by cold deformation as in the case of Nb-Zr alloys. Such alloys are preferably niobium-titanium alloys with 10–90% by weight of titanium. In order to improve their technological or physical properties, a tantalum additive of 0–30% by weight may be provided.

In order to prevent a transition from the superconductive state to the normal conductive state spreading from the plate 3, every cross-sectional area F of the plate 3 traversed by the current in one direction must be sufficiently large for the conduction $I \leq i_c \cdot F$ to be always fulfilled for the critical current-density $i_c$ of the plate material and for the maximum permissible current I.

Figure 3:
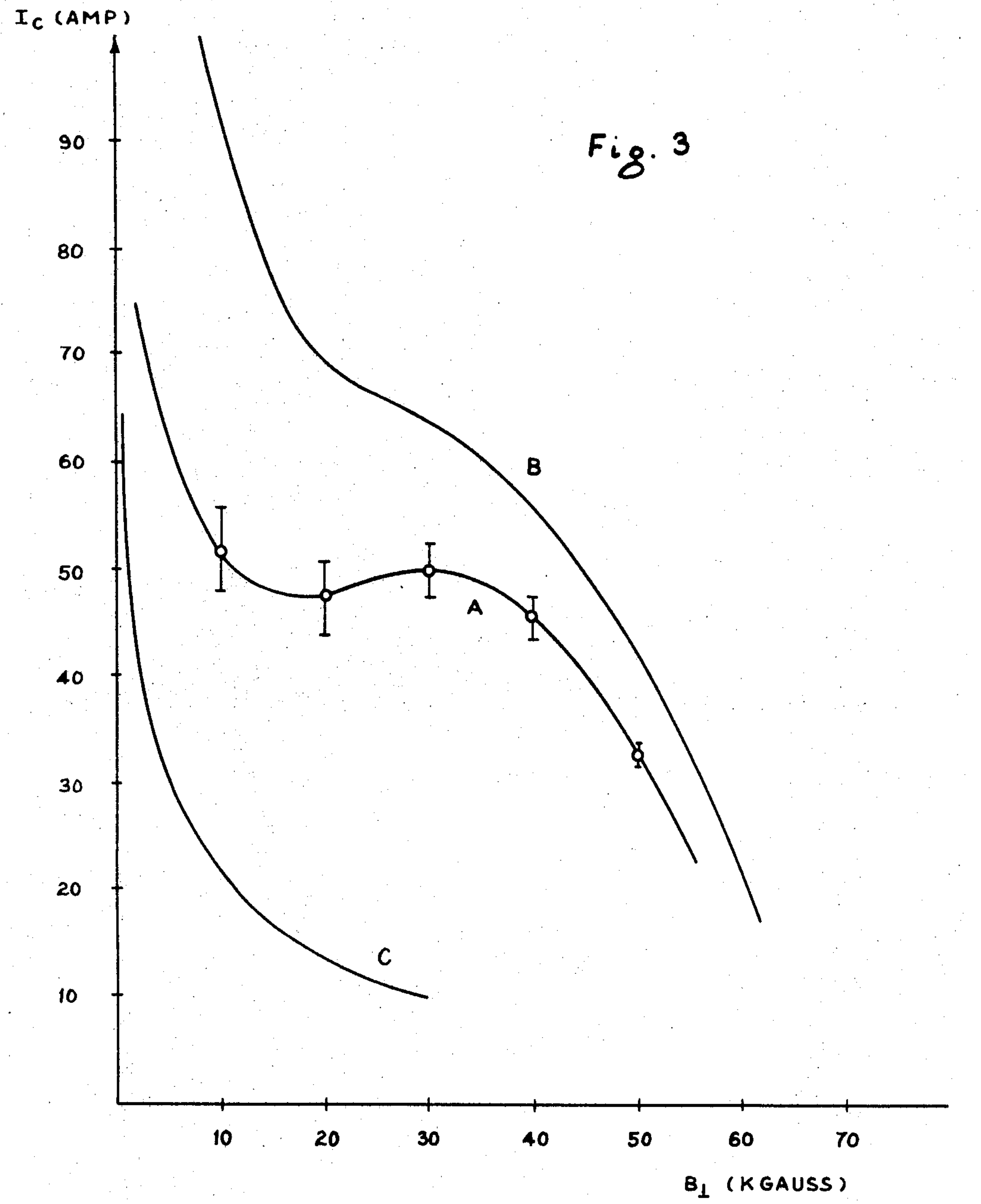
FIG. 3 is a graph showing the relation between the current in the connection and the magnetic transverse-field induction.

In FIG. 3, curve A shows how the critical amount of current $I_c$ in the connection described depends on the magnetic transverse-field induction $B_1$. For comparison, curves B and C show the critical amounts of current for the uninterrupted wire and for a connection in which the ends of the wires are directly spot-welded to one another.

As will be seen, the critical amount of current $I_c$ is considerably greater in the case of the connection described (curve A) than in the case of the connection with direct welding of the ends of the wires (curve C).

We claim:

1. An electrical connection between the ends of two conductors whereof at least one is made of a hard-superconductive material, the connection exhibiting an electrical resistance of less than $10^{-6}\Omega$ in the presence of a magnetic induction of 30 kGauss, wherein the ends of the conductors are spot-welded to a plate made of a hard-superconductive material of the type in which the critical current-density has been increased by annealing.

2. An electrical connection according to claim 1, wherein the plate is connected to an underlay of normal conductor material.

3. An electrical connection according to claim 1, wherein the hard-superconductive conductors comprise coatings of a normal conductor material which are removed at least at the spot-welds.

4. An electrical connection according to claim 3, wherein the normal conductor coatings on said hard-superconductive conductors are electrically connected to one another by a normal conductor piece.

5. An electrical connection according to claim 1 wherein said hard-superconductive conductors include copper coatings thereon which are removed at the spot welds and which further includes a copper sheet forming an underlay for said plate, said copper sheet being electrically connected to said copper coatings.

6. An electrical connection according to claim 1, wherein the plate is made of a niobium-titanium alloy with 10–90% by weight of titanium and an additive of 0–30% by weight of tantalum.

7. An electrical connection according to claim 1, wherein in every cross-sectional area F of the plate traversed by the current in one direction is sufficiently large for the condition $I \leqslant i_c \cdot F$ to be always fulfilled for the critical current-density $i_c$ of the plate material and for the maximum permissable current I.

References Cited

UNITED STATES PATENTS 3,201,850 8/1965 Kahan ---------------- 29—599
3,309,457 3/1967 Emery et al. ---------- 174—94
3,449,818 6/1969 Lowe et al. -------- 29—599 XR
3,453,378 7/1969 McInturff -------------- 174—94

DARRELL L. CLAY, Primary Examiner

U.S. Cl. X.R.

29—599, 628; 335—216